July 30, 1963     E. A. THOMPSON     3,099,221
CENTRIFUGAL PUMP
Filed March 23, 1960     3 Sheets-Sheet 1

INVENTOR.
EARL A. THOMPSON
BY
Ralph L. Tweedale
ATTORNEY

INVENTOR.
EARL A. THOMPSON
BY
Ralph L. Tweedale
ATTORNEY

July 30, 1963  E. A. THOMPSON  3,099,221
CENTRIFUGAL PUMP
Filed March 23, 1960  3 Sheets-Sheet 3

INVENTOR.
EARL A. THOMPSON
BY
Ralph L. Tweedale
ATTORNEY

United States Patent Office 3,099,221
Patented July 30, 1963

3,099,221
CENTRIFUGAL PUMP
Earl A. Thompson, 1300 Hilton Road, Ferndale, Mich.
Filed Mar. 23, 1960, Ser. No. 17,058
5 Claims. (Cl. 103—108)

This invention relates to centrifugal pumps and more particularly to multistage centrifugal fluid pumps, and has for its principal object the attainment of high rotor speeds with fewer losses than heretofore possible.

The three primary causes of loss and inefficiency in centrifugal pumps are leakage, turbulence and skin friction. Various means have been devised to overcome all three of these problems; however, skin friction in the interstage return passages between the radial flow impellers in multistage centrifugal pumps continues to be a problem confronting the industry. Methods for rendering the walls of the interstage passage which is ordinarily formed in the fixed casing of the pump as smooth as possible are now reaching the limits of engineering feasibility, and entirely new approaches are indicated if skin friction is to be further minimized as a loss factor in multistage centrifugal pumps.

Accordingly, it is an object of the present invention to provide a multistage centrifugal fluid pump wherein the skin friction in the interstage return passages between the various stages of radial flow impellers is reduced to a minimum.

Another object of this invention is to provide an annular interstage return passage between successive radial flow impellers which is extremely smooth walled and efficiently converts the velocity head built up in a prior impeller to pressure head preparatory to entrance into the next succeeding impeller.

Another object is to provide an annular interstage return passage, the walls of which are not a part of the pump casing but are freely mounted as a unit within the pump casing for rotation only in response to the skin friction of fluid passing therethrough.

A further object is to provide an annular freely rotatable interstage return passage, the inner and outer circumferential walls of which are joined by a minimum of spokes positioned and streamlined to offer as little resistance as possible to the flow of fluid therethrough.

A still further object is to provide an improved sealing arrangement based on a unique method of preventing leakage.

Further objects and advantages of the present invention will be apparent from the following detailed description, with reference to the accompanying drawings in which like reference characters refer to the same parts throughout the several views, and in which.

Figure 1:
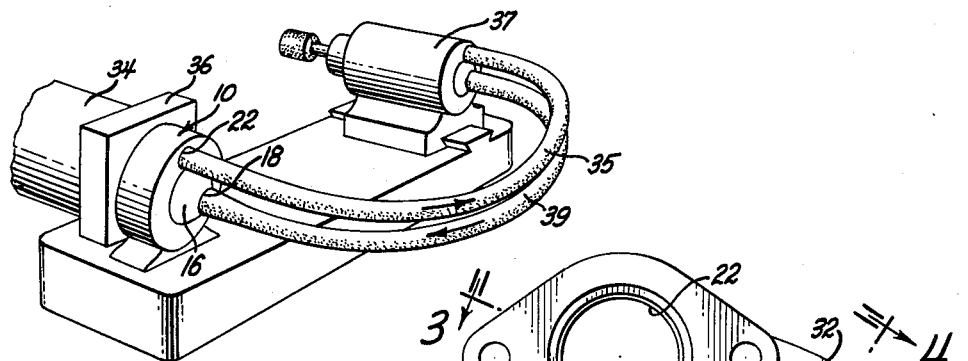
FIGURE 1 is a schematic perspective view showing one environment in which the pump of this invention may be utilized.

One environment in which the pump of this invention may be used is shown in FIGURE 1. A flexible conduit 35 may direct fluid under high pressure from an outlet port 22 of the pump to a turbine 37 mounted for reciprocation and driving a work-performing tool. After the high pressure head of the fluid is transformed into work in the turbine, the fluid is returned by another flexible conduit 39 to an inlet port 18 of the pump 10, where the pressure head is again increased. Instead of a single turbine 37, it will be understood that two or more may be connected in parallel or series to operate from a single pump 10.

Figure 2:
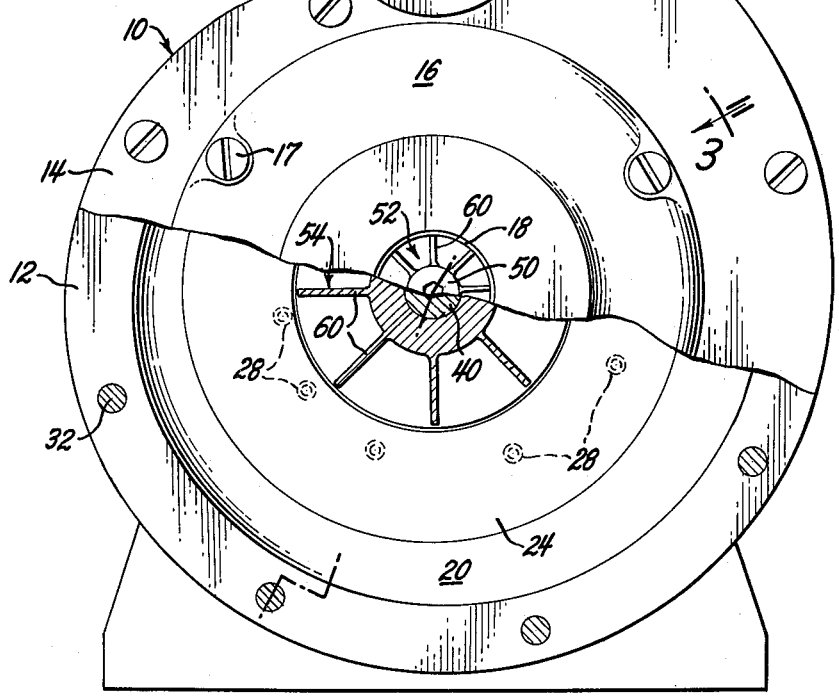
FIGURE 2 is a view partly in section of the pump of this invention.
Figure 3:
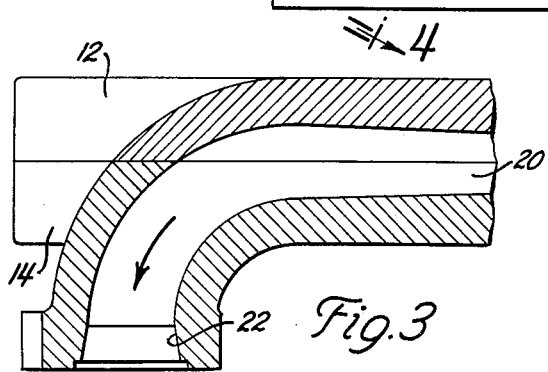
FIGURE 3 is a sectional view of the outlet port of the pump of this invention taken along the lines 3—3 of FIGURE 2.
Figure 4:
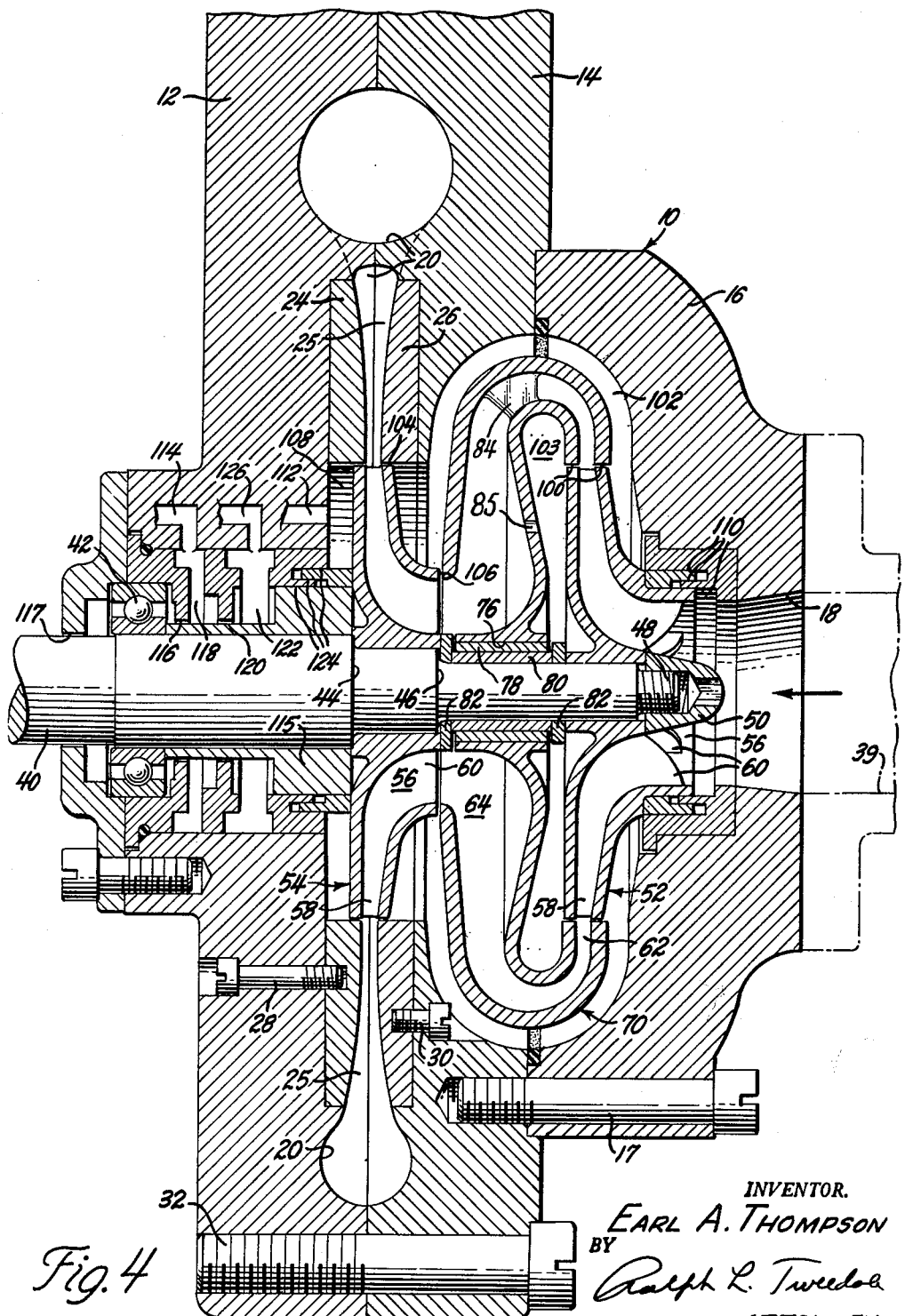
FIGURE 4 is a sectional view taken along line 4—4 of FIGURE 2.

Looking at FIGURES 2 and 4, the pump 10 may consist of a volute casing made of two mating halves 12 and 14 and a rotor casing 16 held thereagainst by bolts 17. Rotor casing 16 contains the central inlet port 18, and the volute casing contains a volute 20 communicating with the discharge port 22 in a conventional manner.

A motor 34 acting through a suitable speed increasing gear box 36 may be used to power the pump. Pump drive shaft 40 (FIGURE 4) extends into the pump casing through suitable bearings 42 in a round hole or opening in the half 12 of the volute casing and continues through larger openings, to be described, in the half 14 of the volute casing and the rotor casing 16, concentric with the inlet port 18. Shoulders 44 and 46 on shaft 40 define two portions of reduced diameter, the second and smaller of which terminates in a threaded end 48 upon which a bullet-shaped jam nut 50 is screwed within the inlet port.

Within the halves 12, 14 of the volute casing are annular vortex wall inserts 24, 26 secured to the two halves by bolts or other suitable means 28, 30, respectively. When the two halves 12, 14 of the volute casing are secured together by means of bolts 32, the annular vortex wall inserts form a free vortex fluid passage 25 whose cross-sectional area increases rapidly in the direction of fluid flow to effect a final conversion from the velocity head built up in the rotor staging, to pressure head prior to passage of fluid through the volute and to the outlet port 22. Annular vortex wall inserts 24, 26 are made of stainless steel or other very hard material which will effectively resist eroding action caused by the skin friction of fluid passing therethrough at a very high rate of speed. As the fluid whirling outwardly through the annular free vortex slows down as a result of the rapid increase in cross-sectional area of the vortex passage, the velocity head is converted to pressure head, and the fluid enters the volute which gathers and directs the fluid to transport it at increased pressure and original velocity through the discharge port 22.

Shaft 40, as is conventional in multistage centrifugal fluid pumps, drives a plurality of stages, each stage consisting of a radial flow impeller unit. Two such impeller units are shown in the pump of this invention at 52 and 54. Each impeller comprises an annular inlet opening 56 and, spaced concentrically outwardly therefrom, an outlet opening 58; the passage is further characterized by the presence of impelling vanes 60, eight of which are shown. The vaning may either be straight, radial vanes as shown, or generally straight generally radial vanes with some sort of curvature at one end, or straight, non-radial vanes, or generally straight, generally non-radial vanes with curvatures of some sort at one end, or vanes of varying curvature or length, or any other design which may be found desirable depending upon diverse conditions such as the type of fluid to be pumped. As can be seen in FIGURE 4, radial flow impeller 54 is pressed upon a reduced diameter portion of the shaft 40 against the shoulder 44, and its outflow opening 58 communicates with the annular free vortex passage 25. Impeller 52 is secured upon the smaller diameter portion of the shaft 40, and its inflow opening 56 communicates with the inlet port 18.

Figure 5:
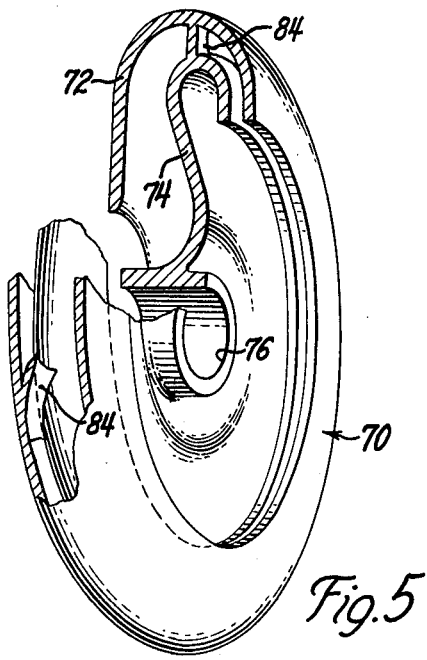
FIGURE 5 is a perspective view with parts broken away showing the housing for the annular interstage return passage.
Figure 7:
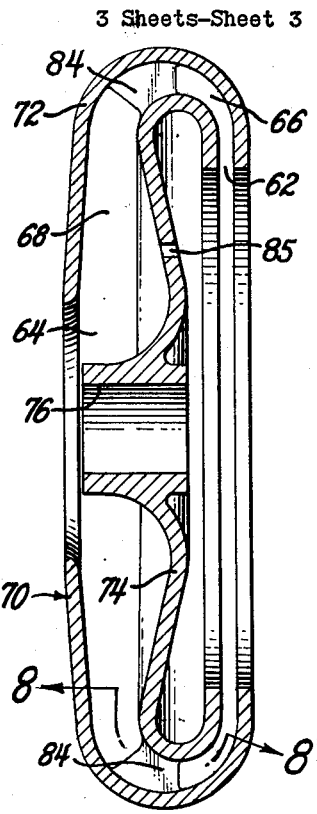
FIGURE 7 is a sectional view of the housing taken along lines 7—7 of FIGURE 6 and further showing the location of the streamlined spokes therein.
Figure 6:
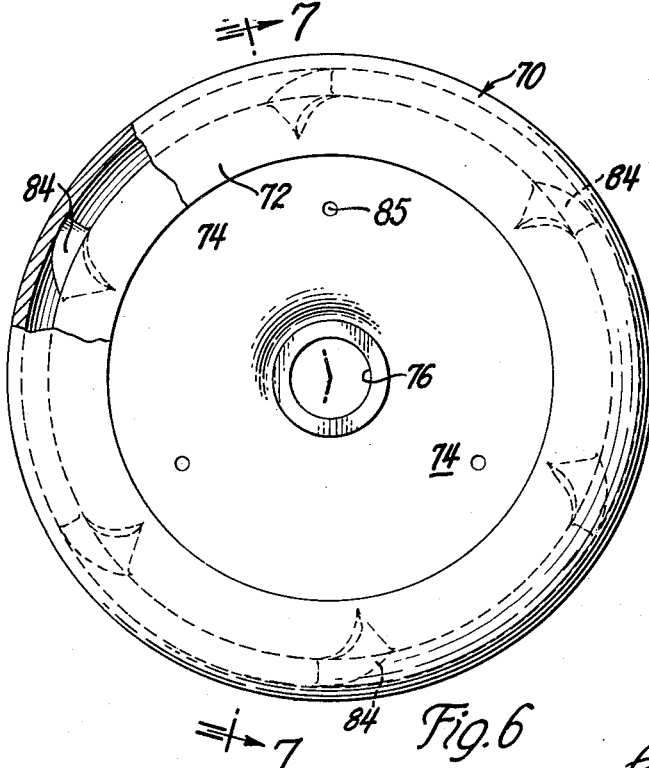
FIGURE 6 is a front view of the same housing with a portion broken away to show the positioning of the spokes therein.
Figure 8:
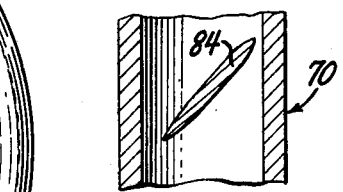
FIGURE 8 is a developed sectional view taken along lines 8—8 of FIGURE 7 showing the angular positioning of the spokes and the streamlining thereof in the return passage housing.

Interposed between the outflow opening 58 of the impeller 52 and the inflow opening 56 of impeller 54 is the interstage return passage, with an annular inflow opening 62 and an annular outflow opening 64. The inflow opening 62 is of approximately the same cross-section area as the outflow opening 58 of impeller 52 with which it communicates, and the outflow opening 64 is of approximately the same cross-sectional area as the inflow opening 56 of impeller 54 with which it communicates. Between the inflow opening 62 and outflow opening 64 of the interstage return passage, the passage quickly increases in cross-sectional area both by diverging circumferentially outwardly away from the central shaft and by an axial divergence of the walls thereof as in area 66 (see FIGURES 5 and 7), then, to return the fluid from the outer zone back toward the center of the pump where it may enter the next succeeding impeller stage, the passage is curved toward the center of the pump and the walls continue to diverge so that the cross-sectional area will remain approximately constant, as in the area 68, to maintain the pressure head which was built up between the areas 62 and 68 as a result of loss of velocity head.

The interstage annular return passage for the pump of this invention is formed as a separate unit 70 between outer and inner circumferential boundary walls, 74, respectively, and the unit 70 is designed to be mounted for free rotation within the pump casing. This enables the walls of the return passage to have motion of their own along with the fluid moving rapidly therethrough. Inner wall 74 has at its center a cylindrical surface 76 designed to fit around the smallest reduced diameter portion of shaft 40. As seen in FIGURE 4, this surface is fitted with an annular bearing sleeve 78 (preferably tungsten carbide or similar material) which rotates freely about another bearing sleeve 80 which is fitted on the shaft 40. Inner bearing sleeve 80 is positioned between thrust bearing members 82 which in turn are pressed between the two adjacent radial flow impellers and fixed therewith to shaft 40 by the locking force of the jam nut 50 pressing the entire asesmbly against the shoulder 44 of shaft 40. Thus it can be seen that the interstage return passage housing 70 is mounted for free rotation by the bearings 78, 80 about shaft 40 within the volute casing and the rotor casing. Also, by providing more than two stages of radial flow impellers similar to impeller 54, with interstage return passage housings similar to the unit 70 interposed therebetween, as many stages as desired can be incorporated in a pump embodying the principals of this invention. The fact that only two radial flow impellers stages are shown should be taken as merely exemplary and not limiting in this disclosure.

Shaft 40 driven by the motor 34 rotates at a very high velocity and the various radial flow impellers such as 52, 54 which are affixed to the shaft rotate therewith. Fluid entering the inlet port 18 is thrown tangentially outwardly by the action of the vanes 60 in the various impeller stages. After leaving each impeller stage, the fluid is travelling at a very high rate of speed and must be brought back toward the center of the pump so it can enter the next adjacent impeller stage. In so doing, the velocity head developed in the previous stage is converted to pressure head prior to entering the next impeller.

The increase in pressure head achieved by the use of the freely rotatable return passage as opposed to the pressure head developed in a conventional return passage formed in a stationary pump casing is attained in the following manner. When fluid is forced through a smooth walled passage at extremely high velocities, the skin friction between the fluid and the walls does work such as generating heat. The work done constitutes a loss of energy, or head, along the passage—a loss which is a function of the velocity. Depending upon a number of factors, the most important of which are the smoothness of the walls and the density of the fluid, the loss of head formulas utilize mathematical relationships which vary generally as the square of the relative velocity between the fluid and the wall.

Assuming fluid leaves the outflow opening of an impeller and enters a stationary return passage tangentially at a velocity of 200 feet per second, the formula for loss of head would utilize the square of the relative velocity between the fluid and the stationary walls, or 40,000. However, with freely movable walls as provided by this invention, the friction of the fluid on the walls will impart motion to the walls; fluid in the stationary cavity 102 surrounding the movable walls will of course exerts a counter drag of the same amount. Consequently, the relative velocity between the moving fluid and the inside of the walls will be only 100 feet per second, and the relative velocity between the stationary fluid and the outside of the walls will account for the other 100 feet per second. Thus the formula for loss of head would incorporate the sum of the squares of these two velocities, or only 20,000. It can be appreciated, then, that the use of the freely rotatable walls for the return passage succeeds in diminishing the loss of head by approximately one-half; an exceedingly important saving in the current state of development of the pump art.

As seen in FIGURES 5 through 8, the inner and outer walls of the return passage housing 70 are spaced from one another by several spokes 84. The spokes are located near the outer periphery of the annular passage and are elongated and streamlined, as can best be seen in FIGURE 8, to have as little influence as possible upon the passing fluid. The spokes are positioned at an angle, which may approximate 45 degrees, to the longitudinal axis of the housing, which will be equal to the angle of the path of the fluid. While the shape and positioning of the spokes is not extremely critical, it is desirable that they should be designed to exert as little influence as possible upon the flow of fluid. Several holes 85 are provided in the inner wall 74 to allow the pressure in zone 103 to equal that in area 68. Thus, a freely rotatable interstage return passage housing 70 is provided which will both convert velocity head to pressure head and return fluid delivered by one impeller to the next succeeding impeller with a minimum of loss occasioned by skin friction in the passage.

Means are also provided for preventing loss of fluid from the system. Fluid leaked between moving surfaces such as at 100, 104 and 106 into chamber 102 will tend to escape from this chamber near the inlet port 18, but is confined to a considerable extent by a series of throttling surfaces 110. As can be seen, any fluid escaping past the throttling surfaces 110 will return to the fluid circuit and continue again into the first impeller, and will thus not escape from the system. Fluid escaping between surfaces 104 will also escape into a chamber or zone 108 between the shaft 40 and the annular vortex wall insert 24. The zone 108 is tapped by a line 112 which will return almost all of the leaked fluid to the pump inlet at a location not shown.

Lubrication for bearings 42 mounted in the casing is provided by an air-oil-mist supplied at a relatively high pressure through port 114 to a pressure chamber 118. The mist passes under pressure between the surfaces of the casing and the rotating member 115 as at 116, through the bearings 42 to lubricate them, and then out the opening 117 around the shaft 40. Some of the oil-mist in the chamber 118 is also forced by its pressure past the relatively moving surfaces at 120 and into a chamber 122 where it may be collected. From here, however, the oil-mist will be prevent from commingling with the fluid which has leaked from the main pump passages to zone 108 and being returned to the circuit therewith. As the oil-mist at a higher pressure mixes in collecting chamber 122 with leaked pumped fluid having come through throttling surfaces 124 at a lower pressure, the mixture is drawn out through a line 126 and into a suitable drain, keeping the pressure in the chamber 122 well below that in either of zones 108 or 118. The pressure of the fluid coming through the throttling surfaces 124 from zone 108 will allow passage only in one direction, and the mixture in chamber 122 will not pass back through the surfaces 116 into the chamber 118 because of the pressure of the oil mist from port 114.

Thus, a comparatively free running pump, fully lubricated yet without any danger of lubricants entering the pump's fluid passages, is provided which reduces losses caused by leakage to a bare minimum, and which materially reduces skin friction losses by the use of the freely rotatable interstage return passage housing.

While the above described embodiment constitutes a preferred mode of carrying out this invention, many other forms might be adopted within the scope of the actual invention, which is variously claimed as:

1. A multistage centrifugal pump comprising first and second radial flow impellers for generating velocity energy in fluid, power means connected to drive the impellers, wall means forming an essentially open and substantially unobstructed annular interstage return passage for directing fluid from the first to the second impeller, the wall means initially forming a diverging portion of the passage for the fluid leaving the first impeller to diffuse the velocity energy in the fluid and transform it to pressure energy and then forming a generally constant portion of the passage to effectively preserve such pressure energy and direct the fluid radially inwardly to the second impeller, the latter portion of the passage being vaneless to avoid subtracting energy from the fluid therein, and means mounting the wall means for rotation to decrease the relative speed between the wall means and the fluid flowing from the first to the second impeller to reduce skin friction losses in the annular interstage return passage.

2. A multistage centrifugal pump comprising a casing, first and second radial flow impellers within the casing for generating velocity energy in fluid, power means connected to drive the impellers, wall means within the casing forming an essentially open and substantially unobstructed annular interstage return passage for directing fluid from the first to the second impeller, the wall means including inner and outer annular housing members each having relatively smooth surfaces and relatively gentle, non-abrupt curvatures to reduce turbulence in flowing fluid, the housing members initially forming a diverging portion of the passage for the fluid leaving the first impeller to diffuse the velocity energy in the fluid and transform it to pressure energy and then forming a generally constant portion of the passage to effectively preserve such pressure energy and direct the fluid radially inwardly to the second impeller, the latter portion of the passage being vaneless to avoid subtracting energy from the fluid therein, and bearing means mounting the wall means in the casing for free rotation to decrease the relative speed between the wall means and the flowing fluid to reduce skin friction losses in the annular interstage return passage.

3. A multistage centrifugal pump comprising a casing, first and second radial flow impellers within the casing for generating velocity energy in fluid, power means connected to drive the impellers, wall means within the casing forming an essentially open and substantially unobstructed annular interstage return passage for directing fluid from the first to the second impeller, the wall means including an inner annular housing member and an outer annular housing member, spoke means inter-connecting the housing members to secure them in rigid spaced relation, the spoke means being streamlined and positioned to minimize the creation of turbulence in flowing fluid, the housing members initially forming a diverging portion of the passage for the fluid leaving the first impeller to diffuse the velocity energy in the fluid and transform it to pressure energy and then forming a generally constant portion of the passage to effectively preserve such pressure energy and direct the fluid radially inwardly to the second impeller, the latter portion of the passage being vaneless to avoid subtracting energy from the fluid therein, and bearing means mounting the wall means in the casing for free rotation to decrease the relative speed between the wall means and the flowing fluid to reduce skin friction losses in the annular interstage return passage.

4. A multistage centrifugal pump comprising a casing, a central inlet channel and a voluted discharge port in the casing, plural radial flow impellers within the casing for generating velocity energy in fluid, power means connected to drive the impellers, wall means within the casing forming an essentially open and substantially unobstructed annular interstage return passage for directing fluid between adjacent impellers, the wall means initially forming a diverging portion of the passage for the fluid leaving one impeller to diffuse the velocity energy in the fluid and transform it to pressure energy and then forming a generally constant and vaneless portion of the passage to effectively preserve such pressure energy and direct the fluid radially inwardly to the next impeller, other wall means within the casing forming an essentially open and substantially unobstructed annular passage for directing fluid from the final impeller to the voluted discharge channel, the other wall means forming a diverging vortex passage for the fluid leaving the final impeller to diffuse the velocity energy in the fluid and transform it to pressure energy, and means mounting one of the wall means in the casing for rotation to decrease the relative speed between such wall means and the flowing fluid to reduce skin friction losses.

5. A multistage centrifugal pump comprising a casing, first and second radial flow impellers within the casing for generating velocity energy in fluid, a shaft extending into the casing and connected to rotate the impellers as a unit, power means outside the casing connected to drive the shaft, a sealing arrangement to reduce fluid leakage losses where the shaft extends into the casing wall means within the casing forming an essentially open and substantially unobstructed annular interstage return passage for directing fluid from the first to the second impeller, the wall means initially forming a diverging portion of the passage for the fluid leaving the first impeller to diffuse the velocity energy in the fluid and transform it to pressure energy and then forming a generally constant portion of the passage to effectively preserve such pressure energy and direct the fluid radially inwardly to the second impeller, the latter portion of the passage being vaneless to avoid subtracting energy from the fluid therein, and bearing means mounting the wall means in the casing for free rotation to decrease the relative speed between the wall means and the flowing fluid to reduce skin friction losses in the annular interstage return passage.

References Cited in the file of this patent

UNITED STATES PATENTS

| | | |
|---|---|---|
| 2,049,774 | Hoffman | Aug. 4, 1936 |
| 2,321,276 | De Bolt | June 8, 1943 |
| 2,555,492 | Kidney | June 5, 1951 |
| 2,650,116 | Cuny | Aug. 25, 1953 |
| 2,660,121 | Curtis et al. | Nov. 24, 1953 |
| 2,710,205 | Brkich | June 7, 1955 |
| 2,775,945 | Arutunoff | Jan. 1, 1957 |
| 2,816,509 | Rice | Dec. 17, 1957 |
| 2,888,193 | Greenwald | May 23, 1959 |

FOREIGN PATENTS

| | | |
|---|---|---|
| 66,352 | Denmark | Feb. 23, 1948 |
| 81,028 | Switzerland | Aug. 6, 1918 |
| 902,942 | Germany | Jan. 28, 1954 |
| 1,033,790 | France | Apr. 8, 1955 |